Oct. 21, 1958 J. I. LESKINEN 2,856,701
RADAR TARGET SIMULATOR
Filed May 4, 1954
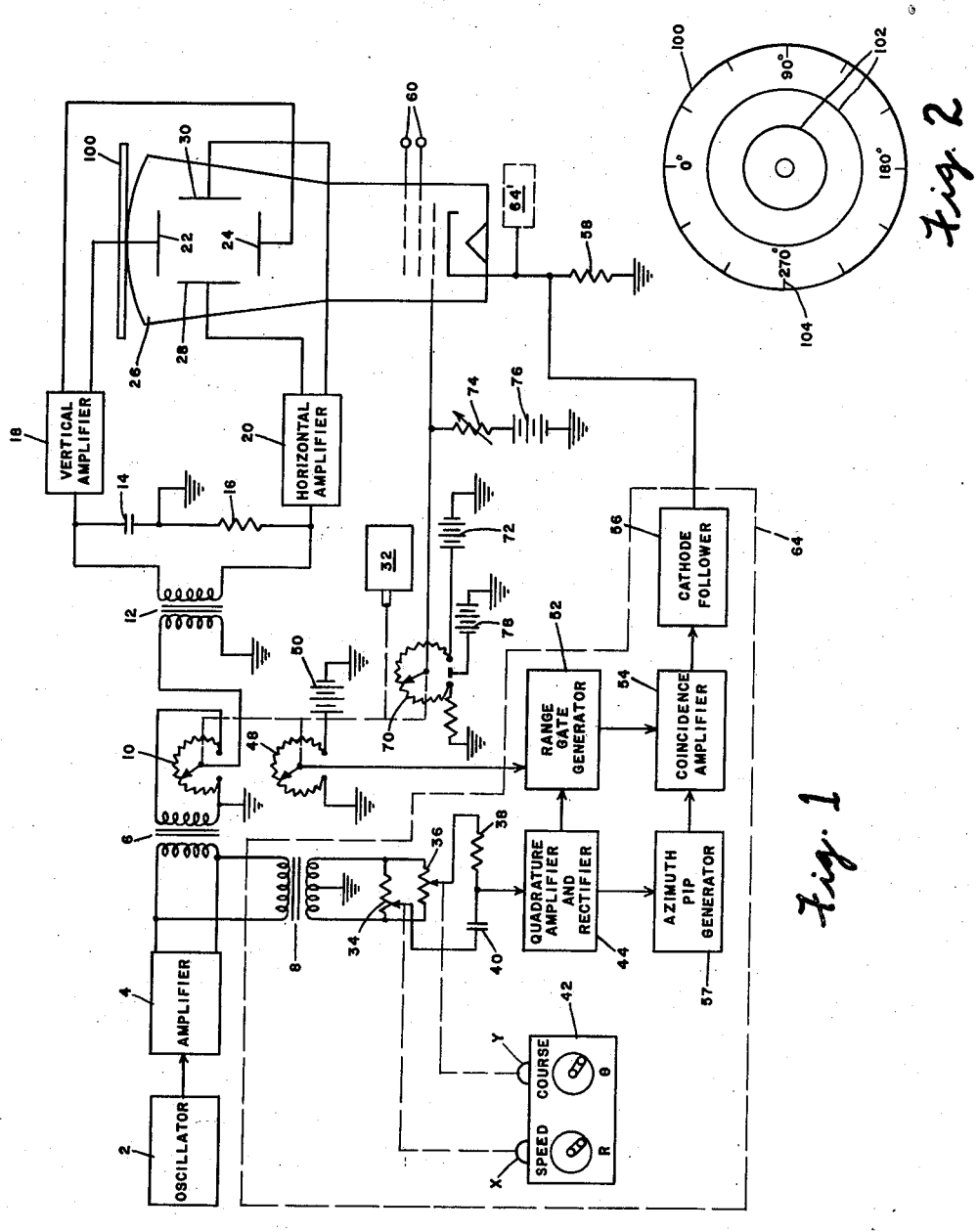
INVENTOR
JORMA I. LESKINEN
BY
ATTORNEYS

United States Patent Office 2,856,701
Patented Oct. 21, 1958

2,856,701

RADAR TARGET SIMULATOR

Jorma I. Leskinen, Flushing, N. Y.

Application May 4, 1954, Serial No. 427,683

8 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates in general to training devices and in particular to the generation and presentation of a plurality of images on a cathode ray tube to realistically simulate target images as indicated on the screen of a radar unit.

To understand and accurately interpret the information that is presented by a radar unit, the operator must spend much time learning familiarization procedures and techniques. To read and accurately interpret the information that is presented by the radar unit requires many hours of practice. One of the methods of instruction utilizes a complete radar unit to track the movement of actual operating vehicles such as ships or airplanes. The radar unit is operated under normal use conditions. The information presented on the radar screen shows the actual position of each vehicle at each instant. This method of instruction is not practical because of the large expense that is involved in operating the vehicles, the complete restriction of a number of expensive vehicles and radar units, the limited number of trainees at each training period, and the fact that the actual operating equipment can only be used for the intended training purposes during clear weather.

Another method that is utilized is to train individuals in the art of reading and interpreting information on a radar screen by the generation of a plurality of targets by synthetic methods. The generated targets are then fed into an actual radar unit and all appear as realistic targets. This method is not practical in that a number of very expensive radar units are deactivated from actual service for training purposes.

The optimum equipment for instruction comprises a unit that simulates the radar unit and the target vehicles. In this manner the actual operational equipment is not removed from its required position, the cost is low and the training periods are not limited by weather conditions, time of day and the like.

The present invention comprises a complete unit that simulates accurately and realistically a radar unit to display a plurality of targets. The displayed targets are generated by synthetic means. The course and speed of the generated targets are controllable within prescribed limits to accurately reproduce the vehicle motion and to generate various desired patterns of maneuvers.

It is an object of this invention to simulate the radar image of a plurality of targets.

It is another object to train individuals to quickly and accurately read and interpret information that is displayed on a radar screen.

It is an additional object to provide a radar training device that can operate continuously.

It is still another object to provide a device that will simulate and display prescribed generated maneuvers of definite types of vehicles.

Other objects and many of the attendant advantages of this invention will be readily appreciated as the same becomes better understood by reference to the following detailed description when considered in connection with the accompanying drawings wherein:

Fig. 1 is a block and schematic diagram of this invention including in specific detail a complete unit for the generation, simulation and display of a single target, and Fig. 2 illustrates a transparent indicator that contains range markings and an azimuth scale, and is placed over the face of the cathode ray tube.

Referring to Fig. 1, therein is shown a block and schematic diagram of this invention for the generation and display of a single target as it would appear under actual tracking conditions. An oscillator 2 generates a sinusoidal voltage wave form of some convenient frequency. An acceptable frequency was found to be five thousand cycles per second. The generated frequency of said oscillator 2 is fed into and amplified by the amplifier 4. The output of said amplifier is connected to the primary windings of a combination of parallel connected isolation transformers 6 and 8. The secondary of said isolation transformer 6 is connected across the constant resistive element of a potentiometer 10. The movable contact of said potentiometer 10 is electrically connected to the primary of a transformer 12. The secondary of said transformer 12 is connected across a phase splitting network consisting of a series combination of a condenser 14 and a resistor 16. The junction of said resistor and condenser is grounded. The ungrounded side of the condenser 14 and the associated secondary terminal of the transformer 12 are connected to the input of the vertical amplifier 18. The other secondary terminal of the transformer 12 and the ungrounded end of the resistor 16 are connected to the input of the horizontal amplifier 20. The series resistive-capacitive network generates two identical voltages that are ninety degrees out of phase. One voltage is amplified in the vertical amplifier 18 and the other voltage is amplified in the horizontal amplifier 20. The output of said vertical amplifier 18 is connected to the vertical plates 22 and 24 of a cathode ray tube 26. The output of said horizontal amplifier 20 is connected to the horizontal plates 28 and 30 of said cathode ray tube 26. The amplifiers 18 and 20 are of the balanced push-pull type. The movable contact of said potentiometer 10 is rotated by any convenient means, such as an electric motor 32, at a speed of fifteen revolutions per second.

The potentiometer 10 alters the amplitude of the generated sinusoidal voltage. Thus the resistive-capacitance phase splitting network receives a linearly increasing sinusoidal voltage wave. This alternating voltage wave, after being split, shifted in phase, amplified and fed into the cathode ray tube, results in the generation of a sweep on the face of said tube that is spiral in nature and radiates from the center.

The secondary of the isolation transformer 8 contains a grounded center tap. Across said secondary there is connected a parallel combination of potentiometers 34 and 36. The movable contacts of said potentiometers are electrically interconnected by means of a phase shifting network consisting of a series connection of a resistance 38 and a condenser 40. The positions of the movable contacts of the potentiometers 34 and 36 determines the phase shift of the output voltage whereby said phase shift is variable from zero to three hundred and sixty degrees. The arms of the potentiometers 34 and 36 are mechanically controlled by the output X axis and Y axis shafts of a target course generator 42 that has, as inputs, the selected course and speed of the simulated vehicle. The outputs provided by the X and Y axis shafts correspond to the X and Y rectangular coordinates which are equivalent to the polar coordinate position of the target at any instant. (This type of target course generator is fully described in "The Handbook of Operation and Maintenance for Standard Target Course Generator Device 15–J–4–p," NAVEXOS P–976, published by Special Devices Center of the Office of Naval Research, Sandspoint, New York in May 1952.)

The operation of the course generator 42 will be briefly described for convenience of the reader.

The target course generator 42 is a standard commercial target course generator wherein the speed and the course of the target can be varied independently and simultaneously. The device contains two basic elements, one for varying the speed and the other for resolving the speed output into X and Y components representative of a given target course.

The variable speed element comprises a disc and ball roller type integrator. The disc rotates at a constant speed and the balls are displaceable along the radial axis of the disc thereby varying the output speed of the roller. Highest speed is obtained when the balls are near the periphery of the disc, lowest speed when the balls are near the center of rotation of the disc.

The output of the variable speed element represents the input to the course element. The input is resolved into two components, speed multiplied by the sine of the course angle, and speed multiplied by the cosine of the course angle. Each of these components appears in the form of rotation of an output shaft.

The course element is, in its mechanical construction, quite similar to the speed element. It comprises a single rotating disc, but has two ball carriages and two rollers. Each set of balls drives a separate roller whereby each set of balls is selectably adjustable along the radial surface of the disc. Zero speed output of each roller is obtained at the sine-cosine quadrature points. This is accomplished by using a differential to subtract a constant speed from the variable output speed of each roller. The constant speed corresponds to the speed of the roller when its associated ball carriage is positioned at the mid-point of its radial excursion along the face of the disc.

A "Scotch Yoke" mechanism is used for shifting the ball carriages in such a manner as to retain, at all times, the sine-cosine relationship of the output rollers. This mechanism consists of two meshed gears with a pin located in the side of each gear and displaced 90° relative to each other. The pins position the ball carriage and are maintained between two closely fitted bars to insure minimum backlash.

The output of the phase shifter appears at the junction of the resistance 38 and condenser 40, and is fed into a quadrature amplifier and rectifier 44, the rectifier including conventional filter means. The phase shift network produces an output voltage from the junction between elements 38 and 40 to ground which can be shifted up to 360° in phase relative to the voltage across the secondary of transformer 8. The quadrature amplifier receives and amplifies the voltage from said phase shift network. Said amplifier is of conventional design, the phase shift network and quadrature amplifier being more fully disclosed in Patent No. 2,555,442 issued to Everett B. Hales on June 5, 1951 and indicated, in said patent, by the reference numerals 32, 33 and 34. It should be noted that the phase shift network utilized here performs a function of quadrature addition, taking a pair of inputs in rectangular coordinates and adding them in quadrature to provide a single polar coordinate output whose magnitude is proportional to the range of the simulated target and whose phase angle is proportional to the azimuth of the target. The A. C. output of said amplifier is fed to an azimuth pip generator 57, and simultaneously to a conventional detector and filter. The D. C. output of the filter is proportional to the range of the target and is fed to a range gate generator 52.

The azimuth pip generator may include biased blocking oscillator (for examples of usable circuits see vol. 20 of M. I. T. Radiation Laboratory Series, Figs. 4—1 or 4—3) which produces "pips," or pulses of short duration, having a period equal to that of the output of oscillator 2. Since the phase angle of the input sine wave to the azimuth pip generator is proportional to the azimuth angle of the target, the phase angle of the generated pips is also proportional to the target azimuth angle.

The amplifier 44 thus generates an A. C. and a D. C. voltage signal from the initial phase shifted signal. The rectified or D. C. signal is proportional linearly to the range of the target. The A. C. voltage signal is variable in phase and is compared with a reference signal from the transformer 12 to generate the azimuth of a target. The comparison of these two voltages is accomplished within the cathode ray oscilloscope tube 26. The second or D. C. signal is compared to a uniformly linear increasing voltage that reaches a maximum predetermined value and then returns instantly to a minimum predetermined level. The comparison saw tooth voltage is generated by means of a potentiometer 48 and a voltage supply 50. The potentiometer 48 is connected between the voltage supply 50 and ground. The movable contact of the potentiometer 48 is mechanically connected to a rotating prime mover such as the electric motor 32 and is revolved at the rate of nine hundred revolutions per minute. Said movable contact of the potentiometer 48 is electrically connected to the range gate generator 52. The rectified and filtered D. C. voltage from the quadrature amplifier and rectifier 44 is also inserted into the range gate generator 52.

The range gate generator 52 may be a comparator circuit such as a modified version of that shown in Fig. 18–44 of Terman's "Electronic Radio Engineering" fourth edition, published in 1955 by the McGraw-Hill Book Company, Inc. The sawtooth voltage obtained from the linearly swept potentiometer 48 may be applied to the input terminals and the D. C. voltage from the filter of the quadrature amplifier and rectifier 44 may be substituted for the battery marked E1. The diode connections should be reversed since the sawtooth voltage rises in the positive direction. The amplifier tube T2 should be biased to its cutoff value and the second normally conducting, conventional amplifier stage should be added to obtain a positive-going output pulse. Circuit element values are chosen so that the duration of the output pulse will be equal to the period of the output of oscillator 2.

Another type of circuit which may be employed in the range gate comparator is a combination of a comparator and a single-shot multi-vibrator. The comparator may be the simple diode comparator shown in Fig. 9–14 of vol. 19 (Wave forms) of the M. I. T. Radiation Laboratory Series and the single-shot multi-vibrator may be the type shown in Fig. 211, page 194, of the War Department Manual TM 11–466, "Radar Electronic Fundamentals, published June 29, 1944.

At the instant that the D. C. voltage signal from the potentiometer 48 is equal to the D. C. voltage signal from the quadrature amplifier and rectifier 44, the output pulse is generated by the range gate generator 52. This pulse is fed to the coincidence amplifier 54. The coincidence amplifier 54 may be one of several well known types of circuit in which the simultaneous application of two signals is required to cause a vacuum tube device to conduct. For example, circuits which may be employed include the "and" gate type of circuit utilized in the computer field and the concidence amplifier described on page 659 of the previously cited "Electronic and Radio Engineering" by Terman.

The other output of the quadrature amplifier and rectifier 44 is squared and then peaked by conventional circuits forming part of the azimuth pip generator 57 that are known to those experienced in the art. (For squaring and peaking circuits, see, for example, Section VII of the War Department Technical Manual TM 11-466, "Radar Electronic Fundamentals," published June 29, 1944.) The squaring circuit amplifies and clips the sine wave input from the quadrature amplifier and rectifier 44 to form a square wave. The leading edge of this positive-going square wave is then differentiated to produce a train of positive pips or pulses. These pips are now employed to trigger a pulse-producing circuit which may be a blocking oscillator such as described under the section heading "One-Shot Operation of the Blocking Oscillator" on page 636 of the previously mentioned "Electronic and Radio Engineering" by Terman. The duration of each pip or pulse produced by the blocking oscillator is comparable to the beam width of the antenna of the simulated radar set.

The output of said azimuth pip generator 57 is fed into the coincidence amplifier or gate 54. The coincidence amplifier or gate 54 allows a single voltage pulse of the azimuth pip generator to pass through when said amplifier 54 simultaneously receives a voltage pulse from said range gate generator 52. Thus, the pulse that appears at the output of the coincidence amplifier or gate 54 has been delayed in range and phase with reference to the voltages from the potentiometers 48 and 10 respectively. The output pulse of the coincidence amplifier or gate 54 is applied to the cathode of the oscilloscope tube 26 through the conventional impedance matching cathode follower 56. The cathode follower is terminated by the resistor 58. Voltages to provide the proper acceleration to the electron particles is applied to appropriate terminals 60 connected to the first and second anodes, of the tube 26.

The potentiometer 70 is ganged to the potentiometers 48 and 10 and its rotatable contact is revolved at a constant rate by some convenient means as the electric motor 32. A potential is placed across said potentiometer 70 by means of a voltage supply or battery 72. The rotatable contact of the potentiometer 70 is electrically connected to the first grid of the cathode ray tube 26. A variable resistor 74 in series with the voltage source is connected across said first grid of the tube 26. The resistor 74 is adjusted to that value that will prevent a trace from appearing on the face of the tube 26 when there is no signal across the resistor 58. The potentiometer 70 regulates the intensity of the electron beam so that a trace of each target will have the same intensity regardless of its location on the face of the tube 26. To prevent the appearance of the return trace of the spiral, a blanking voltage source 78 is connected to an isolated contact of the potentiometer 70. At each instant that the electron beam of the tube 26 returns from its extreme position to its initial position, the electron beam is blanked out by the voltage from the voltage source 78.

The design, construction and operation of the oscillator 2, amplifier 4, vertical amplifier 18, horizontal amplifier 20, quadrature amplifier and rectifier 44, range gate generator 52, azimuth pip generator 57, coincidence amplifier or gate 54 and the cathode follower 56 are well known to those experienced in the art. As such, the details of construction and operation of said units were not described nor illustrated in detail.

Referring to Fig. 2, therein is illustrated a transparent reference indicator 100 that is utilized to determine the range and azimuth of the targets. The scribed circles 102 denote the range of the target. The scale 104 indicates the azimuth of the target.

This invention, as described in detail herein, will generate a single target on a cathode ray tube. To reproduce a plurality of targets the components within the area 64 must be duplicated such as at 64', including isolation transformers connected in parallel with transformers 6 and 8.

In the operation of this device, the operator selects the target course and speed by setting the course and speed indicators of the target course generator 42. The electron beam generates a spiral trace on the screen of the cathode ray tube 26. The trace, however, is not visible until a voltage is applied to the cathode of the tube 26. The range gate generator 52 operates for one complete discrete convolution of the sweep spiral, thus selecting the range of the target. The operation of the range gate generator 52 allows a single pulse from the azimuth pip generator to be fed to the cathode of the tube 26. Said pulse is shifted in phase by an appropriate amount and determines the azimuth of the target. At the instant the voltage pulse is applied to the cathode of the tube 26, an illuminated arc appears on the screen of the tube 26. The illuminated arc represents a target as it appears on a radar screen. The length of the arc is determined by the length of the voltage pulse. The preceding operation is duplicated in the apparatus 64' for the creation of a second target in a similar manner. The number of generators may be increased according to the number of targets desired.

It should be noted that many different circuit combinations, other than those specifically utilized to illustrate the invention, may be employed. For example, various types of multi-vibrators, blocking oscillators, comparators, squaring circuits, peaking circuits and coincident circuits may be substituted for the particular cited circuits. It is therefore to be understood that within the scope of the appended claims, the invention may be practiced otherwise than as specifically described.

What is claimed is:

1. A radar simulator device comprising, in combination: indicating means having a face adapted to provide visual indications; means to generate a cyclical reference signal, means connected to said indicating means adapted to recurrently sweep said visual indications spirally outward from the center of said face, the radial extension of said sweep being equivalent to the total range to be covered; means producing from said reference signal signals having characteristics corresponding to rectangular coordinate values of the geographical position of a simulated target; means combining said rectangular coordinate signals to produce a signal having characteristics corresponding to the polar coordinate values of the position of said target; means producing from said polar coordinate signal an azimuth signal having a phase relation relative to said reference signal proportional to the azimuth angle of said target; means producing from said polar coordinate signal a range signal having a time relation relative to the start of said sweep proportional to the range of said target; and means producing a target signal at time coincidence of said azimuth signal and said range signal, said target signal being applied to said indicating means for the indication of said simulated target at the proper range and azimuth.

2. A radar simulator device comprising, in combination: indicating means having a face adapted to provide visual indications; means to generate a cyclical reference signal; means connected to said indicating means adapted to recurrently sweep said visual indication spirally outward from the center of said face, the radial extension of said sweep being equivalent to the total range to be covered; means producing from said reference signal signals having characteristics corresponding to rectangular coordinate values of the geographical position of a simulated target; means combining said rectangular coordinate signals to produce a signal having characteristics corresponding to the polar coordinate values of the position of said target; means producing from said polar coordinate signal an azimuth pulse having a phase relation relative to said reference signal proportional to the azimuth angle of said target; means producing from said polar coordinate signal a range pulse having a time relation relative to the start of said sweep proportional to the range of said target; said last-named means including means producing a recurrent signal of increasing amplitude, the time of initiation of each cycle of said sweep and said recurrent signal of increasing amplitude being identical, the same agency being utilized to effect this time synchronism; and means producing a target pulse at time coincidence of said azimuth pulse and said range pulse, said target pulse being applied to said indicating means for the indication of said simulated target at the proper range and azimuth.

3. A radar simulator device comprising, in combination: cathode ray tube indicating means having a face adapted to provide visual indications; means connected to said indicating means adapted to recurrently sweep said visual indications spirally outward from the center of said face the radial extension of said sweep being equivalent to the total range to be covered; means to generate a sine wave reference signal; means producing from said reference signal signals having characteristics corresponding to rectangular coordinate values of the geographical position of a simultated target; means combining said rectangular coordinate signals in quadrature to produce a signal having characteristics corresponding to the polar coordinate values of the position of said target, the magnitude of this polar coordinate signal being proportional to the range and the phase of this coordinate signal, relative to that of the reference signal, being proportional to the azimuth of said target position; means producing from said polar coordinate signal an azimuth pulse having a phase relation, relative to said reference signal, proportional to the azimuth angle of said target; means producing from said polar coordinate signal a range pulse having a time relation, relative to the start of said sweep, proportional to the range of said target, said last-named means including means producing a recurrent signal of increasing amplitude, the time of initiation of each cycle of said sweep and said recurrent signal of increasing amplitude being identical, the same agency being utilized to effect this time synchronism; and means producing a target pulse at time coincidence of said azimuth pulse and said range pulse, said target pulse being applied to said indicating means for the indication of said simulated target at the proper range and azimuth.

4. A device as set forth in claim 3, wherein said means producing signals having characteristics corresponding to rectangular coordinate values of the geographical position of a simulated target includes a target course generator of the type having a ball and disc integrator connected to a device adapted to convert the output of the integrator into quadraturely related shaft rotations.

5. A device which provides a realistic simulation of the appearance and movements of targets on a radar scope comprising, in combination: a cathode ray tube indicator; means to generate a sine wave reference signal, means operating upon said sine wave reference signal to produce a pair of recurrent signals, each cycle of recurrence consisting of sine waves having linearly increasing amplitudes, said signals being identical except that one is phase-shifted 90 degrees with respect to the other, and applying said signals to said cathode ray tube to recurrently sweep the electron beam spirally outward from the center, each circular sweep of the electron beam corresponding to a traverse of 360 degrees of azimuth at substantially constant range and the radial extension of the spiral sweep corresponding to the total range to be covered; means operating upon said sine wave reference signal to produce a pair of signals, the amplitude of each being proportional to a different one of the rectangular coordinate values of the geographical position of a simulated target; means combining said rectangular coordinate signals in quadrature to produce a polar coordinate signal which comprises a sine wave signal having a magnitude corresponding to the range and a phase, relative to the phase of said sine wave reference signal, corresponding to the azimuth angle of said target; means producing from said polar coordinate signal an azimuth pulse having a phase relation, relative to said sine wave, reference signal, proportional to the azimuth angle of said target; means producing from said polar coordinate signal a range pulse having a time rela- tion, relative to the start of said outward sweep of said cathode ray tube electron beam, proportional to the range of said target; said last-named means including means producing a second recurrent signal of increasing amplitude, the time of initiation of each cycle of said sweep and said second recurrent signal of increasing amplitude being identical, the same agency being utilized to effect this time synchronism; and means producing a target pulse at time coincidence of said azimuth pulse and said range pulse, said target pulse being applied to said cathode ray tube to provide an indication of said simulated target at the proper range and azimuth.

6. A device as set forth in claim 5, including means connected to said cathode ray tube indicator to prevent emission of said electron beam except when a target pulse is applied.

7. A device which provides a realistic simulation of the appearance and movements of targets on a radar scope comprising, in combination: a cathode ray tube (CRT) indicator; means to generate a sine wave reference signal; means operating upon said sine wave reference signal to produce a recurrent signal, each cycle of recurrence consisting of sine waves of increasing amplitude; means operating upon said recurrent signal to produce signals which, when applied to said CRT indicator, act to recurrently sweep the electron beam spirally outward from the center, each circular sweep of the electron beam corresponding to a traverse of 360 degrees of azimuth at substantially constant range and the radial extension of the spiral sweep corresponding to the total range to be covered; means applying said sweep signals to said CRT indicator; means operating upon said sine wave reference signal to produce a pair of signals, the amplitude of each being proportional to a different one of the rectangular coordinate values of the geographical position of a simulated target; means combining said rectangular coordinate signals in quadrature to produce a polar coordinate signal which comprises a sine wave signal having a magnitude corresponding to the range and a phase, relative to the phase of said sine wave reference signal, corresponding to the azimuth angle of said target; means producing from said polar coordinate signal an azimuth pulse having a phase relation, relative to said sine wave reference signal, proportional to the azimuth angle of said target; means producing from said polar coordinate signal a range pulse having a time relation, relative to the start of said outward sweep of said CRT electron beam, proportional to the range of said target, said last-named means including means producing a second recurrent signal of increasing amplitude, said two means which produce recurrent signals being coupled together to act synchronously; and means producing a target pulse at time coincidence of said azimuth pulse and said range pulse, said target pulse being applied to said CRT indicator to provide an indication of said simulated target at the proper range and azimuth.

8. A device as set forth in claim 7, wherein said two means producing recurrent signals comprise linearly wound potentiometers having continuously rotatable contact arms, the contact arms being mechanically coupled so as to rotate in synchronism.

References Cited in the file of this patent

UNITED STATES PATENTS

| | | |
|---|---|---|
| 2,492,356 | Cesareo | Dec. 27, 1949 |
| 2,555,442 | Hales | June 5, 1951 |
| 2,562,987 | Laws | Aug. 7, 1951 |
| 2,617,982 | Holschuh et al. | Nov. 11, 1952 |
| 2,624,043 | Gerwin et al. | Dec. 30, 1952 |
| 2,627,673 | Droz | Feb. 10, 1953 |
| 2,669,033 | Brown | Feb. 16, 1954 |
| 2,677,199 | Droz | May 4, 1954 |
| 2,693,647 | Bolster et al. | Nov. 9, 1954 |